United States Patent
Iida et al.

[11] Patent Number: 5,205,880
[45] Date of Patent: Apr. 27, 1993

[54] PNEUMATIC TIRES WITH RECESSES IN THE BEAD REGION

[75] Inventors: Hiroyuki Iida; Makoto Tsuruta; Yasuhiko Kobayashi; Hiroyuki Koseki, all of Kodaira, Japan

[73] Assignee: Bridgestone Corporation, Tokyo, Japan

[21] Appl. No.: 789,890

[22] Filed: Nov. 12, 1991

[30] Foreign Application Priority Data

Nov. 13, 1990 [JP] Japan ................................. 2-306864

[51] Int. Cl.$^5$ ........................ B60C 3/00; B60C 15/024
[52] U.S. Cl. .................................... 152/454; 152/523; 152/539
[58] Field of Search ............... 152/539, 454, 544, 546, 152/552, 523

[56] References Cited

U.S. PATENT DOCUMENTS

4,057,092  11/1977  Tracy .................................. 152/523
4,185,676  1/1980  Raluy .

FOREIGN PATENT DOCUMENTS

0413426   2/1991   European Pat. Off. .
3218315   5/1982   Fed. Rep. of Germany .
1517850  12/1966   France .
1538478   7/1967   France .
2415016   1/1978   France .
55-19685  2/1980   Japan .
56-51925 12/1981   Japan .
63-51887 10/1988   Japan .
1210935  11/1970   United Kingdom .
2016385   9/1979   United Kingdom .

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire involves a toroidal carcass ply extending between a pair of beads. The carcass ply consists of a main body located axially inside the beads and a pair of outer ply portions each extending along the main body of the carcass ply and on an axially outer side of the bead. A recess is provided on an outer surface of the tire between a radially outer end of each of the outer ply portions of the tire and the tire maximum width location such that a part of the recess is located in a zone surrounded by a curve C—C, a curve D—D, and an E-axis. The curve C—C satisfies $d/s = 1 - 0.825 \times \sqrt{2.64 - (h/s)}$, and the curves C—C, and D—D, the E-axis, d, s, h are defined as follows: a widthwise center line of the main body of the carcass ply being taken as A—A; a curve passing through the radially outer end of the outer ply portion and being parallel with the curve A—A being taken as B—B; an axis lying on the curve B—B and extending from the radially outer end of the outer ply portion toward the location having maximum width being taken as an H-axis; an axis extending from the radially outer end of the outer ply portion toward an interior of the tire in a direction orthogonal to the H-axis being taken as the E-axis; a distance from an origin as measured along the E-axis extending the radially outer end of the outer ply portion toward the interior of the tire in a direction orthogonal to the H-axis being taken as d, the origin being an intersection between the E-axis and the H-axis; a distance from the radially outer end of the outer ply portion to the center line A—A as measured on the F-axis being taken as s; a distance from the origin as measured along the H-axis being taken as h; and the curve D—D being a curve extending between the curves A—A and B—B and being parallel with the center line A—A, while being spaced from the center line A—A by ⅓s.

4 Claims, 2 Drawing Sheets

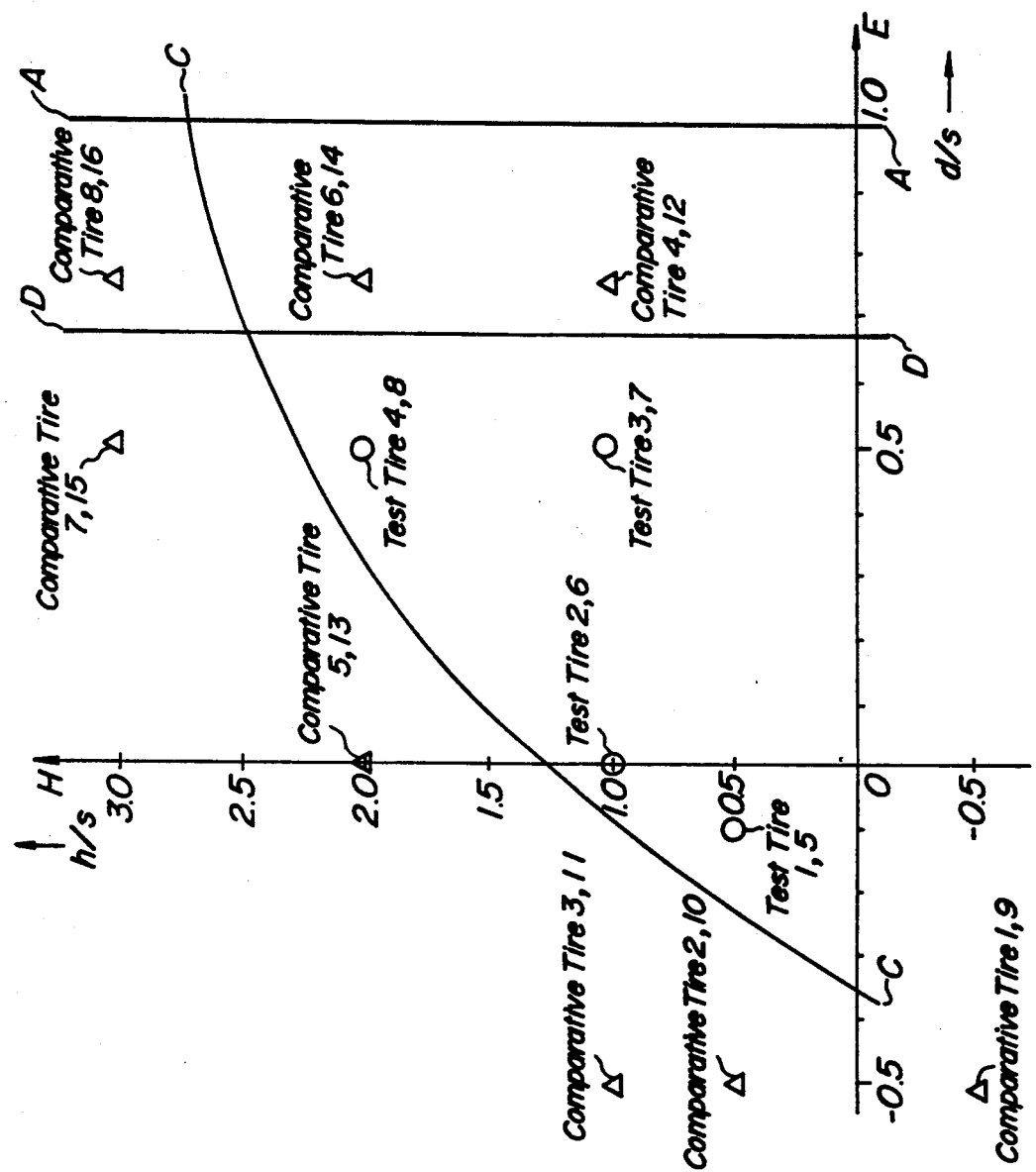

PNEUMATIC TIRES WITH RECESSES IN THE BEAD REGION

BACKGROUND OF THE INVENTION

1. Field of the Invention

The present invention relates to pneumatic tires having durability of bead portions improved.

2. Related Art Statement

As the pneumatic tire having durability of bead portions improved, for example, a tire as described in GB No. 1,210,935 is known. This tire is a pneumatic tire with a carcass ply composed of a main body axially inside beads and outer ply portions extending axially outside the respective beads and axially outside the main body of the carcass ply, wherein a recess is formed on an outer surface of the tire at a location spaced radially outwardly from a radially outer end of the outer ply portion by 10-50 mm such that the recess has a depth being equal to 1/10 to ½ of a gauge at that portion of the tire on which the recess is to be formed, and occurrence of cracks liable to occur at the radially outer end of the outer ply portion is suppressed by this recess.

However, since numerical ranges defining the location and the shape of the above recess of the pneumatic tire are determined to cover numerous kinds of tires, such numerical ranges merely give a general guide for the formation of recesses in specific kinds of tires. Even when a recess is actually so formed in a specific tire that the recess may satisfy the above numerical ranges for the location and the shape, durability of the bead portion is not improved in many cases.

The reason is that when the above recess is to be formed, the numerical ranges therefor are determined to empirically produce certain effects through a number of experiments without theoretically solving the reason why the durability of the bead portion is improved.

SUMMARY OF THE INVENTION

Under the circumstances, the present inventors have made various investigations on causes for producing cracks at the radially outer end of the outer ply portion. In these investigations, the inventions first analyzed strain produced at the radially outer end of the outer ply portion. Results are as follows:

That is, when a pneumatic tire 10 as shown in FIG. 1 is run under load, a sidewall portion 12 is deflected on a ground contact side, and the sidewall portion 12 from a location 11 giving the maximum width of the tire (hereinafter referred to as "the tire maximum width location) which location is positioned on a radially outer side beyond the radially outer end 16 of the outer ply portion 15 to a bead portion 13 is axially outwardly bent. The bead portion 13 from a base portion 14 of a bead 17 to the radially outer end 16 of the outer ply portion 15 is reinforced with the bead 17, a carcass ply 18, a reinforcing ply 19, etc. Therefore, rigidity of the bead portion 13 is higher there than that of the sidewall portion 12. As a result, the sidewall portion 12 is apparently bent around the radially outer end 16 of the outer ply portion 15 as a fixed fulcrum. Since the sidewall portion 12 is bent like this, stresses are repeatedly applied to every portion of the tire from the sidewall 12 to the bead portion 13. Since modulus greatly differs between the reinforcing cords buried in the outer ply portion 15 and rubber surrounding these reinforcing cords at the radially outer end 16 of the outer ply portion 15, stress concentrates upon the rubber surrounding the reinforcing cords, so that a deformed amount of rubber becomes locally great to produce cracks.

The present inventors have analyzed the distribution of stresses at the sidewall portion 12 due to the above-mentioned bending deformation within a sectional view along a tire meridian line. First, since the sidewall portion 12 can be considered as a beam having the radially outer end 16 of the outer ply portion 15 as a fixed fulcrum, stresses occurring in the sidewall portion 12 can be considered to be stresses occurring in the beam. Under this assumption, when the sectional area of the beam is made constant or when the gauge of the sidewall 12 is made constant, maximum stress occurs on the fixed fulcrum of the beam (the sidewall portion 12) or the maximum stress occurs at the radially outer end 16 of the outer ply portion, and cracks occur there. On the other hand, when the sectional area of the beam is increased in proportion to a square root of a distance measured from a free end or when the gauge of the sidewall portion 12 is increased in proportion to a square root of a distance measured from a certain point from a side of the tire maximum width location 11, stresses acting upon various locations of the beam or the sidewall portion 12 become equal. However, if a portion having a sectional area smaller than that of the portion giving rise to the above equal stresses is provided on the way of the beam or if a portion thinner than the portion giving rise to the above equal stresses is provided on the way of the sidewall portion 12 by forming, for example, a recess 21 there, the maximum stress is considered to occur not at the fixed fulcrum of the beam or not at the radially outer end 16 of the outer ply portion 15 but at this portion having the smaller sectional area or at the recessed portion at 21.

However, since rubber is actually attached to the axially outer side of the radially outer end 16 of the outer ply portion 15 of the pneumatic tire 10 and the radially outer end 16 is influenced by the surrounding ply, etc., it is considered that the above-mentioned effects cannot be necessarily obtained even by merely increasing the gauge of the sidewall portion 12 in proportional to a square root of the distance of a certain point from the tire maximum width location.

Under the circumstances, the present inventors have analyzed the relationship between the gauge of the sidewall portion 12 and the stress and the strain occurring at the radially outer end 16 of the outer ply portion 15 during running of the tire under load. As a result, the inventors have found that in order to produce equal stresses over the entire sidewall portion 12, the shape of the outer surface of the sidewall portion 12 is designed to meet the following requirement:

That is, a recess is provided on an outer surface of the tire between the radially outer end of each of the outer ply portions of the tire and the tire maximum width location, i.e., that location of the tire giving rise to a maximum width which is located radially outwardly from the radially outer end of the outer ply portion, and a part of this recess is located in a zone surrounded by a curve C—C, a curve D—D, and an E-axis, this curve C—C satisfying the following equation: $d/s = 1 - 0.825 \times \sqrt{2.64 - (h/s)}$. The curves C—C and D—D, the E-axis, d, s, h are defined as follows:

First, a widthwise center line of the main body of the carcass ply is taken as A—A and a curve passing through the radially outer end of the outer ply portion and being parallel with the curve A—A is taken as B—B. An axis lying on the curve B—B extending from the radially outer end of the outer ply portion toward the tire maximum width location is taken as an H-axis, and an axis extended from the radially outer end of the outer ply portion toward an interior of the tire in a direction orthogonal to the H-axis is taken as an E-axis. A distance from an origin as measured on an E-axis extending toward the interior of the tire from the radially outer end of the outer ply portion in a direction orthogonal to the H-axis is taken as d. The above origin is defined by the E-axis and the h-axis, that is, the origin is an intersection between these axes. A distance from the radially outer end of the outer ply portion to the center line A—A as measured on the E-axis is taken as s. A distance from the origin as measured along the H-axis is taken as h. The curve D—D is a curve extending between the curves A—A and B—B and parallel with the center line A—A, while being spaced from the center line A—A by $\frac{1}{3}$s. The distance between the curve D—D and the center line A—A being $\frac{1}{3}$s is a value obtained when the tire is inflated with a normal internal pressure. But, it is considered that this value will not so changed even if no internal pressure is applied to the tire.

When the recess is formed on the outer surface of the sidewall portion 12 between the radially outer end 16 of the outer ply portion 15 and the tire maximum width location 11 such that a part of the recess enters axially inside beyond the curve C—C defined by the above equation, the maximum stress is produced in this recessed portion. Thereby, the stress which would occur at the radially outer end 16 of the outer ply portion 15 is reduced to improve durability of the bead portion. That portion of the recess 21 which axially inwardly enters beyond the curve C—C is generally the deepest portion 22, but that portion may be not the deepest portion 22 but a portion spaced from the deepest portion 22.

As the gauge of the sidewall portion 12 is made thinner by deepening the recess 21, stress occurring at the radially outer end 16 of the outer ply portion 15 is more reduced. As a result, the durability of the bead portion is improved. However, if a part of the recess 21 enters a side of the center line A—A beyond the curve D—D, stress concentrates there to cause great strain. Consequently, wrinkle or crack occurs at this portion so that durability of the bead portion is deteriorated to the contrary. The curve D—D is a curve located between the central line A—A and the curve B—B, while being in parallel with the center line A—A and spaced from the center line A—A $\frac{1}{3}$by s only. For this reason, every portion of the recess 21 must be located on a side of the outer surface of the tire axially outwardly the curve D—D.

For the above two reasons, in order to reduce stress at the radially outer end 16 of the outer ply portion 15 and improve durability of the bead portion, a part of the recess 21, for example, the deepest portion 22, must be located in the region surrounded by the curve C—C, the curve D—D, and the E-axis.

In the above, the outer ply portion 15 means that one of a turn-up portion 23 of the carcass ply 18 located axially outside the bead 17 and a reinforcing ply 19 located axially outside the bead 17 which has a radially outer end located higher than a radially outer end of the other, i.e., the former being located more radially outwardly.

The above recess 21 may be a circumferential groove continuously extending in the circumferential direction of the tire 10, or numerous recesses 21 may be provided while spaced from adjacent ones by a specific interval. Further, not less than a half of the sectional area of the recess 21 defined between the outer surface of the tire has only to be located between the E-axis passing the radially outer end 16 of the outer ply portion 15 and a straight line extend axially inwardly from the tire maximum width location 11. For example, it may be that a radially outer portion of the recess 21 is partially extended radially outwardly beyond the tire maximum width location 11, or as shown in FIG. 1, the radially inner portion of the recess 21 is partially extended radially inwardly beyond the radially outer end 16 of the outer ply portion 15. The recess 21 must be left as a recess even when the pneumatic tire 10 is inflated with a normal internal pressure, and the radially outer end 16 of the outer ply portion 15 must not be exposed outside from the outer surface of the tire.

When the recess 21 is to be formed between the radially outer end 16 of the outer ply portion 15 and the tire maximum width location 11, a part of the recess 21, for example, the deepest portion 22 is located in the region surrounded by the curve C—C, the curve D—D and the E-axis as mentioned above. By so doing, great stress occurs at that portion of the sidewall portion 12 which the recess 21 enter within the above region, so that stress and strain occurring at the rubber surrounding the radially outer end 16 of the outer ply portion 15 are reduced. Consequently, durability of the bead portion is improved.

These and other objects, features and advantages of the invention will be appreciated upon reading of the following description of the invention, when taken in conjunction with the attached drawings, with the understanding that some modifications, variations and changes of the same could be made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a sectional view of a pneumatic tire near a bead portion as taken along a meridian line; and FIG. 2 is a schematic diagram illustrating a location of a deepest portion of each of tires used in Examples and Comparative Examples.

DETAILED DESCRIPTION OF THE INVENTION

Figure 1:
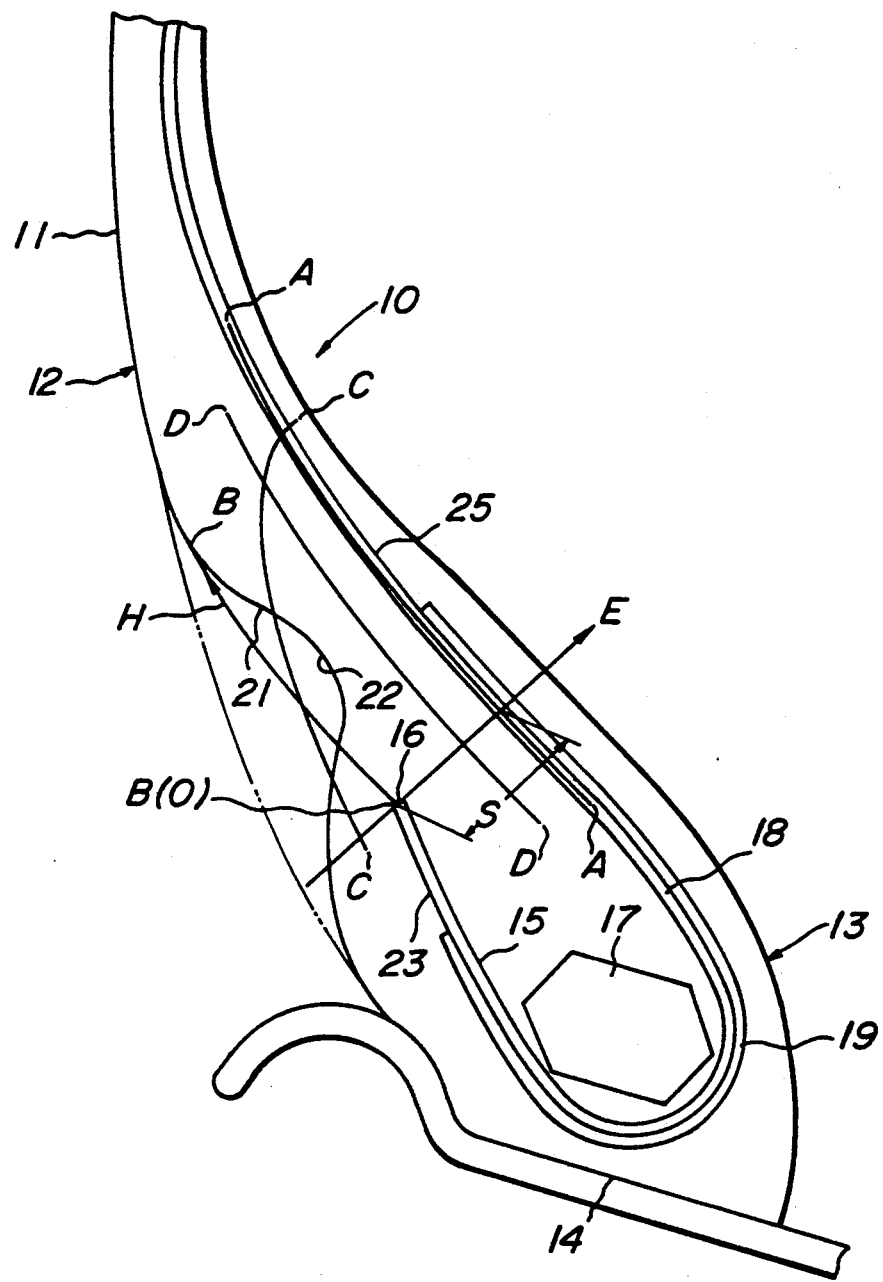

The present invention will be explained in more detail with reference to the following examples and comparative examples.

Experiment I

Totally twelve kinds of pneumatic tires (Tire size: 11/70 R 22.5) each having a recess on an outer surface of the tire between a radially outer end of an outer ply portion and a tire maximum width location were prepared. Eight kinds of these twelve kinds of the pneumatic tires are Comparative tires in which every portion of the recess, the deepest portion representative of the recess here, fell outside the above-mentioned region defined in the present invention. Remaining four kinds of these twelve kinds of the pneumatic tires are Test tires in which a part of the recess, the deepest portion of the recess here, was located inside the above region. In each tire, distances measured along the H-axis and the E-axis, respectively, from the radially outer end of the outer ply portion (an origin being an intersection between the H-axis and the E-axis in FIG. 1) to the deepest portion of the recess were varied as shown in Table 1 and FIG. 2 wherein these distances are indicated by taking the distance s as a unit length. Next, after each tire was inflated with an internal pressure of 8.0 kg/cm², the tire was run on a drum at 60 km/h under application of a load of 5,000 kg until the tire was damaged. Results are shown in Table 1. It is seen from this Table that durability of the bead portions of Test tires is greatly improved as Compared with comparative tires. In Table 1, 100 of the running distance index actually corresponds to 24,000 km.

Experiment II

Totally twelve kinds of pneumatic tires having the same dimensions as those in Experiment I were prepared as shown in Table 2 except that the tire size was changed to 10.00 R 20. Next, after each of the tires was inflated with an internal pressure of 7.25 kg/cm², the tire was run on the drum at 60 km/h under application of the load of 5,000 kg until the tire was damaged. Results are shown in Table 2. As is clear from Table 2, durability of the bead portions of Test tires is greatly improved as compared with Comparative tires. In Table 2, 100 of the running distance index actually corresponds to 38,000 km.

TABLE 2

| | h/s | d/s | Index of run distance | Trouble |
|---|---|---|---|---|
| Comparative tire 9 | −0.5 | −0.5 | 100 | Cracked near radially outer end of outer ply portion |
| Comparative tire 10 | 0.5 | −0.5 | 102 | Cracked near radially outer end of outer ply portion |
| Comparative tire 11 | 1.0 | −0.5 | 97 | Cracked near radially outer end of outer ply portion |
| Comparative tire 12 | 1.0 | 0.75 | 74 | Wrinkled, cracked |
| Comparative tire 13 | 2.0 | 0 | 104 | Cracked near radially outer end of outer ply portion |
| Comparative tire 14 | 2.0 | 0.75 | 81 | Wrinkled, cracked |
| Comparative tire 15 | 3.0 | 0.5 | 99 | Cracked near radially outer end of outer ply portion |
| Comparative tire 16 | 3.0 | 0.75 | 87 | Wrinkled, cracked near radially outer end of outer ply portion |
| Test tire 5 | 0.5 | −0.1 | 120 | Cracked near radially outer end of outer ply portion |
| Test tire 6 | 1.0 | 0 | 117 | Cracked near radially outer end of outer ply portion |
| Test tire 7 | 1.0 | 0.5 | 131 | Cracked near radially outer end of outer ply portion |
| Test tire 8 | 2.0 | 0.5 | 123 | Cracked near radially outer end of outer ply portion |

As understood from the above experiments, when the present invention is applied to completely different kinds of pneumatic tires, durability of the bead portions can be similarly improved.

As having been explained, according to the present invention, durability of the bead portions of the pneu-

TABLE 1

| | h/s | d/s | Index of run distance | Trouble |
|---|---|---|---|---|
| Comparative tire 1 | −0.5 | −0.5 | 100 | Cracked near radially outer end of outer ply portion |
| Comparative tire 2 | 0.5 | −0.5 | 98 | Cracked near radially outer end of outer ply portion |
| Comparative tire 3 | 1.0 | −0.5 | 101 | Cracked near radially outer end of outer ply portion |
| Comparative tire 4 | 1.0 | 0.75 | 72 | Wrinkled, cracked |
| Comparative tire 5 | 2.0 | 0 | 104 | Cracked near radially outer end of outer ply portion |
| Comparative tire 6 | 2.0 | 0.75 | 83 | Wrinkled, cracked |
| Comparative tire 7 | 3.0 | 0.5 | 103 | Cracked near radially outer end of outer ply portion |
| Comparative tire 8 | 3.0 | 0.75 | 79 | Wrinkled, cracked |
| Test tire 1 | 0.5 | −0.1 | 122 | Cracked near radially outer end of outer ply portion |
| Test tire 2 | 1.0 | 0 | 118 | Cracked near radially outer end of outer ply portion |
| Test tire 3 | 1.0 | 0.5 | 137 | Cracked near radially outer end of outer ply portion |
| Test tire 4 | 2.0 | 0.5 | 124 | Cracked near radially outer end of outer ply portion | matic tire can be improved without producing wrinkles or cracks at that portion of the sidewall portion on which the recess is formed.

What is claimed is:

1. A pneumatic tire comprising a pair of beads and a toroidal carcass ply extending between a pair of said beads, said carcass ply consisting of a main body located axially inside said beads and a pair of outer ply portions each extending along the main body of the carcass ply and on an axially outer side of the bead, and a recess provided on an outer surface of the tire between a radially outer end of each of said outer ply portions of the tire and that location of the tire having a maximum width which is located radially outwardly from the radially outer end of the outer ply portion, wherein a part of said recess is located in a zone surrounded by a curve C—C, a curve D—D, and an E-axis, said curve C—C satisfying the following equation: $d/s = 1 - 0.825 \times \sqrt{2.65 - (h/s)}$, said curves C—C, and D—D, said E-axis, d, s, h are defined as follows:

a widthwise center line of said main body of the carcass ply being taken as A—A;

a curve passing through said radially outer end of the outer ply portion and parallel with said curve A—A being taken as B—B;

an axis lying on said curve B—B and extending from said radially outer end of the outer ply portion toward said location having maximum width being taken as an H-axis;

an axis extending from said radially outer end of the outer ply portion toward an interior of the tire in a direction orthogonal to said H-axis being taken as the E-axis;

a distance from an origin as measured along the E-axis extending from the radially outer end of the outer ply portion toward the interior of the tire in a direction orthogonal to said H-axis being taken as d, said origin being an intersection between said E-axis and said H-axis;

a distance from the radially outer end of the outer ply portion to the center line A—A as measured on said E-axis being taken as s;

a distance from the origin as measured along the H-axis being taken as h; and said curve D—D being a curve extending between said curves A—A and B—B and being parallel with the center line A—A, while being spaced from the center line A—A by ½s.

2. The pneumatic tire according to claim 1, wherein not less than a half of the recess is located between the radially outer end of the outer ply portion and the tire maximum width location.

3. The pneumatic tire according to claim 1, wherein every portion of the recess must be located on a side of the outer surface of the tire axially outwardly the curve D—D.

4. The pneumatic tire according to claim 2, wherein every portion of the recess must be located on a side of the outer surface of the tire axially outwardly the curve D—D.

* * * * *